United States Patent [19]

Mueller et al.

[11] 4,187,144
[45] Feb. 5, 1980

[54] NUCLEAR REACTOR POWER SUPPLY

[75] Inventors: Norman P. Mueller, Trafford; Boris A. Mutafelija, Allison Park, both of Pa.

[73] Assignee: Westinghouse Electric Corp., Pittsburgh, Pa.

[21] Appl. No.: 799,632

[22] Filed: May 23, 1977

[51] Int. Cl.² .................. G21C 7/00; G21C 15/00
[52] U.S. Cl. .................. 176/24; 176/19 R; 176/22; 176/55; 60/DIG. 4
[58] Field of Search ............ 176/20, 22, 24, 37, 176/42, 86 L, 50, 19 R, 55; 60/DIG. 4

[56] References Cited

U.S. PATENT DOCUMENTS

| | | | |
|---|---|---|---|
| 2,989,453 | 6/1961 | Esselman | 176/20 R |
| 3,145,149 | 8/1964 | Imhoff | 176/54 |
| 3,222,254 | 12/1965 | Maldegue | 176/22 |
| 3,247,069 | 4/1966 | Powell | 176/20 R |
| 3,423,285 | 1/1969 | Curry | 176/20 R |
| 3,578,562 | 5/1971 | Johnson | 176/86 L |
| 3,630,839 | 12/1971 | Podolsky | 176/20 |
| 3,700,552 | 10/1972 | Schluderberg | 176/20 R |
| 3,799,839 | 3/1974 | Fischer | 176/20 R |
| 3,920,513 | 11/1975 | Loose | 176/20 R |
| 3,998,693 | 12/1976 | Musick | 176/20 R |

FOREIGN PATENT DOCUMENTS 880489  10/1961  United Kingdom ............ 176/20 R

OTHER PUBLICATIONS

Lamarsh, "Introduction to Nuclear Reactor Theory," Addison-Wesley 1966; pp. 448-451.
Love, "Nonlinear Dynamic Optimization Technique etc.," 1970 Nuclear Science Symposium, N.Y., Nov. 4-6, 1970; pp. 408-411.
Sipush et al., "Nuclear Technology, vol. 31, Oct. 1976, pp. 12-31.
Bauer, et al.; Nuclear Technology, vol. 21, Mar. 1974, pp. 165-189.

Primary Examiner—Charles T. Jordan
Assistant Examiner—Donald P. Walsh
Attorney, Agent, or Firm—Z. L. Dermer; L. A. DePaul

[57] ABSTRACT

The neutron absorbing medium in a reactor is changed in dependence upon the loading of the reactor, or any other operating mode where the power distribution axially is to be maintained within acceptable limits, by varying the chemical shim in the coolant of the reactor. The error for effecting the change is derived by comparing the average temperature of the coolant and a reference temperature which is a programmed function of the power delivered by the turbine energized by the reactor. The reference temperature is derived by converting the turbine impulse chamber pressure into a temperature parameter. A compensated temperature error is derived from an electrical compensating network typically a PID controller. At the input of this network an electrical analog of the temperature error is impressed and its output, a compensated temperature error, is derived. The correcting command is derived from the output of a non-linear gain network. At the input of this gain network the compensated temperature error is impressed. The output is supplied to a facility for changing the neutron-absorbing medium which is connected to the reactor. The compensating network and the gain network may be part of an analog logic system or part of a digital computer system.

11 Claims, 3 Drawing Figures

NON-LINEAR GAIN CIRCUIT

NUCLEAR REACTOR POWER SUPPLY

REFERENCE TO RELATED APPLICATION

This application relates to and incorporated by reference application Ser. No. 760,490, filed Jan. 19, 1977, to Norman R. Mueller et al. for *An Improved Method for Operating a Nuclear Reactor to Accommodate Load Follow While Maintaining a Substantially Constant Axial Power Distribution* and assigned to Westinghouse Electric Company.

BACKGROUND OF THE INVENTION

This invention relates to the nuclear power reactor control art and has particular relationship to the load-follow operation of a nuclear reactor which constitutes the primary source of power supply apparatus. In the interest of facilitating the understanding of this invention by reference to a concrete embodiment of this invention, this application predominately deals with a light-water pressurized-water-reactor (PWR) power-supply apparatus. This invention is also applicable to apparatus of other types, for example, boiling-water reactor apparatus and any application of this invention to such other apparatus is within the scope of this application.

A PWR power supply apparatus includes a nuclear reactor having a nuclear fuel core bathed in a coolant which derives heat energy from the core and serves as primary fluid for the apparatus. Primary conductors are connected to the reactor for circulating the heated coolant typically from above the core through steam generators and then back to the lower part of the core. The primary coolant converts water (or other fluid) in the steam generator into steam (or other vapor) which is circulated, through secondary conductors, to drive a turbine. The vapor is then condensed and circulated back as feedwater to the generator.

It is necessary that under all conditions of loading of the turbine the reactivity of the core should be maintained such that for each neutron which produces a fission, one, and only one, neutron be generated. To achieve this purpose the reactor has a neutron-absorbing medium. This medium includes control rods and part-length (P/L) rods which are inserted and removed from the core, on changes in loading, in an effort to match the neutron-absorbing medium to the loading and at the same time to maintain the power distribution axially along the core as nearly uniform as practicable. In addition chemical shim is changed. The expression chemical shim means the injection of material into the coolant which may increase or reduce the neutron absorption. A typical chemical neutron absorbing component of chemical shim is boron ($B^{10}$) which is added to the coolant as boric acid. The neutron absorption can be decreased by replacing the absorbing chemical by water which is also part of the chemical shim.

During turbine-load follow or other operating modes of a reactor requiring movement of the control rods into or out of the fuel core, the axial power distribution along the reactor may be shifted so that it is not within acceptable limits. The part-length (P/L) rods are then moved into or out of the core to correct this maldistribution. Chemical shim is also adjusted to add or remove neutron absorbing medium. In accordance with the teachings of the prior art the adjustment of chemical shim is effected by observing the position of the control rods and adjusting the shim so that the control rods may be kept within a desired well defined operating band. A well defined operating band is a band of movement of the control rods within which the maximum power-change capability, and particularly the spinning reserve, is preserved. The spinning reserve is the difference between any current operating power level of the apparatus and the power level which can be reached in the event of a sudden large demand of power. With the P/L rods moving into or out of the core, as well as the usual primary-to-secondary power mismatch which occurs, it is not possible to predetermine the well defined operating band of the control rods because they are responding to the reactivity variations produced by the movement of the P/L rods as well as the primary-to-secondary power mismatch.

U.S. Pat. Nos. 3,222,254 Maldague et al. and 3,578,562 Johnson et al. are typical of prior art teaching as to adjustment of the chemical shim. Maldague's teaching is to adjust the chemical shim so that the sum of the effects of the reactivity of the adjusted chemical shim and of the Xenon 135, a poison which is generated by the fission, remains constant. Johnson's teaching is to measure the neutron absorption properties of a portion of the coolant passed through a detector and to add or remove neutral absorbing medium by adjusting chemical shim in dependance upon the measurement. Neither Maldague nor Johnson deal with the problem of eliminating maldistribution while retaining the desired power output characteristic of the apparatus.

It is an object of this invention to overcome the difficulties and disadvantages of the prior art. Specifically it is an object of this invention to provide nuclear power-supply apparatus in which, by control of the chemical shim, the power distribution axially along the nuclear reactor core shall be maintained within acceptable limits while preserving a predetermined set of steam generator operating conditions and the maximum power-change capability and particularly the spinning reserve. It is also an object of this invention to provide a method for operating such apparatus.

SUMMARY OF THE INVENTION

This invention arises from the realization that the power-change capability and the spinning reserve of the reactor can be preserved by controlling the temperature of the coolant and the power output of the reactor in dependance upon the power output at the turbines. This object is accomplished by automatically controlling the chemical shim in dependance upon a temperature error which is derived by comparing the average temperature, $T_{avg}$, of the reactor and a reference temperature, $T_{ref}$, which is a programmed function of the turbine power. This reference temperature is a coolant temperature programmed magnitude which is derived from the impulse pressure of the turbine. The impulse pressure is impressed as input on a programming unit. The programming unit correlates the impulse pressures to corresponding desired coolant temperatures. The error temperature:

$$T_e = T_{avg} - T_{ref}$$

and is a measure of the primary to secondary mismatch of the nuclear power apparatus. The apparatus for accomplishing this object includes a compensating network and non-linear gain network. The compensating network is typically a proportional, plus integral plus derivative (PID) controller but may be any other properly selected combination of lead and/or lag circuits or network. The gains and time constants of the compensating network are functions of the reactor coolant and chemical-shim-system parameters and are selected to optimize the performance of the chemical shim control. An electrical analog of $T_e$ is impressed in the input of the compensating network; an electrical compensated temperature error signal, $T_{ec}$ is derived from its output. This signal $T_{ec}$ is impressed in the input of the non-linear gain network. The output of the non-linear gain network controls the injection of chemical shim into the coolant. For this purpose the output of the non-linear gain network modulates valves in a chemical-shim facility which, typically, supplies water or a solution or suspensions containing neutron absorbing material to the coolant, as commanded by the output of the network. The non-linear gain network performs the following functions:

1. It adds a dead band to suppress hunting and improve stability.
2. It permits gain adjustment to supplement the gain of the compensating network.
3. It includes a saturation level to prevent overloading of the controlled equipment.

The non-linear gain network is controlled in accordance with the setting of the control rods. It has shim-change-compensated-temperature-error characteristics with a plurality of dead bands, typically a longer dead band when the control rods are in their normal automatic mode and a shorter dead band when the control rods are not in their normal automatic mode. When the control rods are in their automatic mode chemical shim is needed only to supplement the normal operation of the control rods. This need for supplemental control of neutron absorption occurs when there is a larger-than-normal temperature error $T_e$ and normally persists for only short intervals of time. Typically a larger-than-normal temperature error occurs when the control rods are operating in a low-worth region or when the control-rod speed is not high enough to allow compensation for the combined reactivity effects of the P/L rod motion and power-level changes. The shim-change ($\Delta$Shim)-compensated temperature-error characteristic with the shorter dead band comes into effect when the control rods are not in their normal automatic mode. Typically this occurs under the following conditions:

1. The control rods are at their fully withdrawn position or at their insertion limits.
2. The control rods are deliberately set for manual operation during a Xenon transient to preserve the return to power capability
3. The control rods are deliberately set for manual operation during a power-level change to prevent exesive axial power peaks during a transient.

When the control rods are not in their automatic-control mode, the chemical shim facility is the primary means of reactivity control and must compensate for part length rod motion, load changes and xenon effects. This normally requires a narrower temperature error dead band than when the chemical shim facility only supplements the control rods.

The operation of the chemical shim control, in apparatus according to this invention, during a typical load-follow transient is as follows:

1. When power is being reduced, the control rods compensate for reactivity demands of the turbine power change and for any part-length rod maneuvers required by power distribution control. The chemical shim control is normally inactive as the control rods keep the temperature error within the wider dead band. If the temperature error exceeds the dead band, the chemical shim control adjusts the shim concentration to assist the control rods.
2. During reduced power operation, the control rods are not permitted to move substantially so as to preserve the return-to power capability. The tighter narrower dead band characteristic is switched in and the chemical shim facility adjusts the reactor coolant shim concentration to compensate xenon and any part-length rod adjustments for power distribution control.
3. The chemical-shim-control behavior during the return to power transient is the same as during the power-reduction transient with the wider dead band characteristic in effect.
4. The subsequent xenon redistribution at base load is again handled by the chemical shim control with the narrower dead band in effect. After the xenon transient dies out, primary reactivity control can again be switched back to the control rods.

BRIEF DESCRIPTION OF THE DRAWINGS

For a better understanding of this invention, both as to its organization and as to its method of operation, together with additional objects and advantages thereof, referenece is made to the following description, taken in connection with the accompanying drawings, in which.

DETAILED DESCRIPTION OF EMBODIMENT

Figure 1:
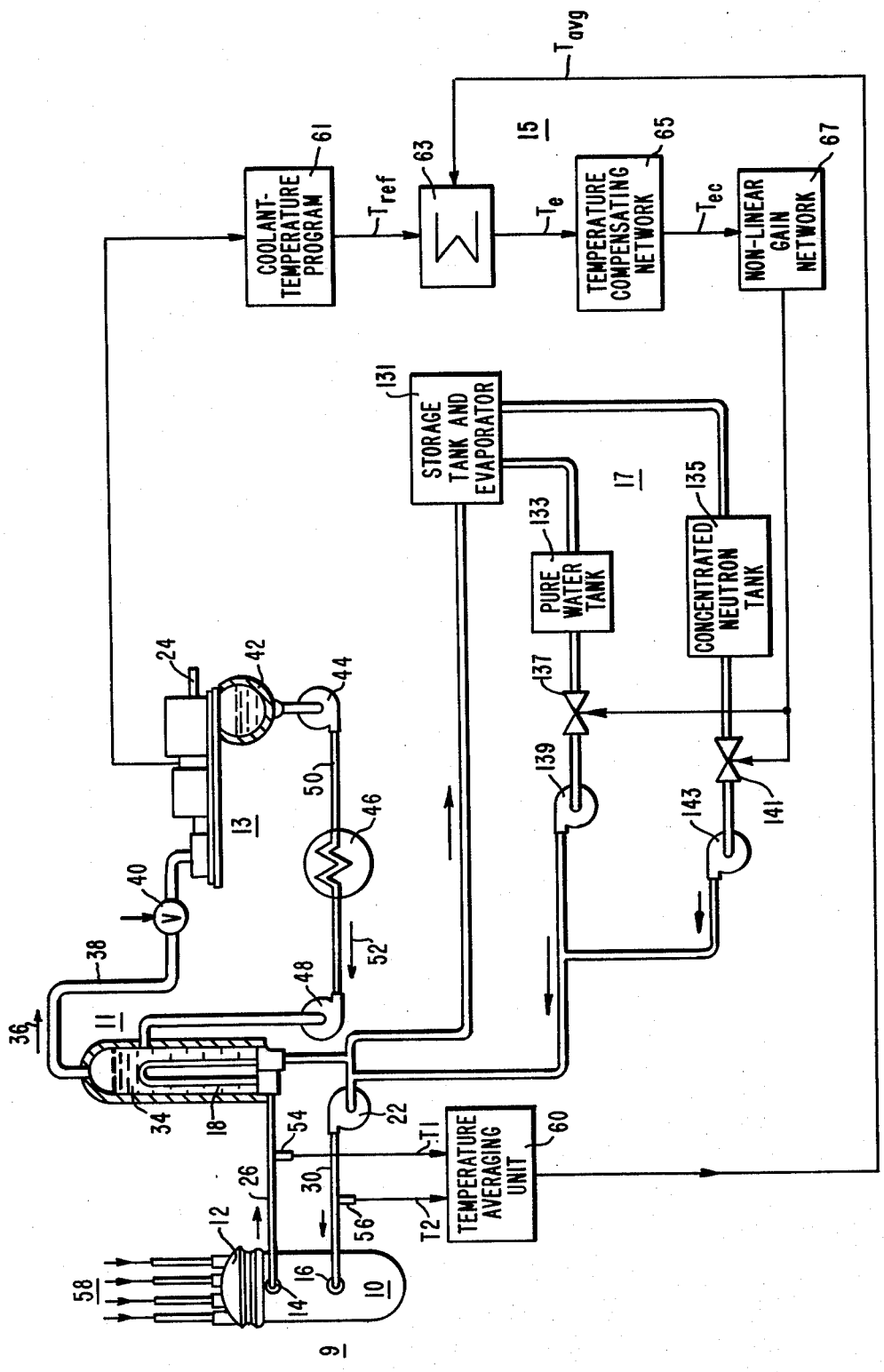
FIG. 1 is a diagrammatic view showing an embodiment of this invention.
Figure 2:
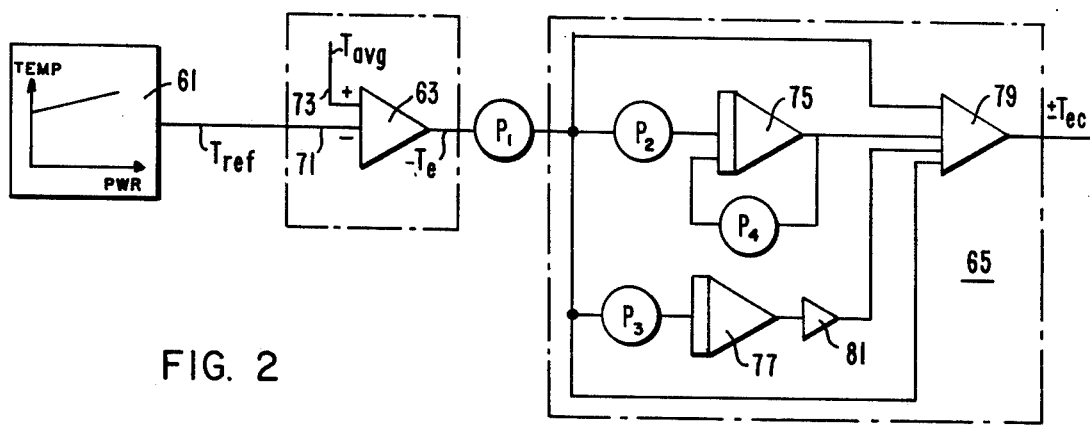
FIG. 2 is a schematic showing the compensating network and non-linear gain network of this invention.

The apparatus shown in FIGS. 1 and 2 includes a nuclear reactor 9, a steam generator 11, a turbine 13, chemical-shim control 15, and a chemical-shim facility 17. There may be a plurality, typically four, steam generators 11. The reactor 9 supplies heat energy to vaporize water in the steam generators 11. The steam from the generators 11 drives the turbine 13. The chemical-shim control controls the supply of chemical shim to the reactor 9. The reactor 9 includes a vessel 10 which forms a pressurized container when sealed by its head assembly 12. The vessel has coolant-flow inlet means 16 and coolant flow outlet means 14 formed integral with and through its cylindrical walls. While only one set of inlet and outlet means 16 and 14 are shown there are typically a plurality of such means to correspond to the number of steam generators 11. The vessel 10 contains a nuclear fuel core (not shown) consisting mainly of a plurality of clad nuclear fuel elements (not shown) which generate heat depending primarily upon the position of control rods 58 in the core and the concentration of chemical shim in the reactor coolant. There are also partlength rods (not shown). The core is bathed in a coolant (not shown). The heat generated by the reactor core is conveyed from the core by the coolant flow entering through inlet means 16 and exiting through outlet means 14. The cooland exiting through outlet means 14 is conveyed through an outlet conduit 26 to the heat-exchange steam-generator 11, wherein the heated cooland is conveyed through tubes 18, which are in heat-exchange relationship with water 34 (or other fluid) which is utilized to produce steam (or other vapor). The steam produced by the generator 11 drives turbine 13 for the production of electricity. The flow of the coolant is conveyed from the steam generator 11 by the pump 22 through a cool leg conduit 30 to the inlet means 16. Thus a closed recycling primary or steam generating loop is provided with the coolant piping coupling the vessel 10 and the steam generator 11. While only one primary loop 26–30 feeding into one generator 11 is shown, there are usually a plurality of such primary loops each feeding a steam generator. Though not shown in FIG. 1, one primary loop of each plant includes a pressurizer which is responsive to the onset of a variation in pressure within the primary fluid due to temperature changes and variations in other operating conditions, to maintain a substantially constant primary pressure.

The secondary side of the steam generator 11 is isolated from the primary coolant by the heat exchange tubes 18. The vapor from generator 11 flows through a steam conduit 38, in the direction of the arrow 36, to a turbine 13 which is connected via shaft 24 to a load, for example, an electrical generator (not shown). The volume of steam exhausted to the turbine is controlled by a throttling valve 40. The steam after passing through the turbine 13 is condensed in a condenser 42. The condensate or water thus formed is returned to the secondary or shell side of the steam generator through conduits 50, and feedwater heater 46, by operation of condensate pump 44 and feedwater pump 48 in the direction of arrow 52. Thus, a recycling secondary electrical generating system is provided with secondary fluid piping coupling the steam generator 11 to the turbine 13.

The coolant temperatures in the reactor outlet conduit 16 and the reactor inlet conduit 30 for each of the primary loops of a typical pressurized-water reactor system, such as the one illustrated in FIG. 1, is sensed by temperature measuring elements 54 and 56, respectively, each of which may comprise a thermocouple or temperature resistance bulb. The temperature measuring elements 54 and 56 produce output signals $T_1$ and $T_2$, respectively, representative of the instantaneous temperature at the measuring location. The $T_1$ and $T_2$ signals for each loop are applied to a temperature averaging unit and the respective averages from the several loops are compared to identify the highest instantaneous average operating temperature of the reactor. The identified operating temperature is then compared to a reference which is the programmed temperature function of the load. In accordance with the teachings of the prior art, when instantaneous identified temperature of the reactor departs from the programmed reference, an error signal is generated which controls movement of the control rods in the direction to minimize the error. Accordingly, a programmed average-temperature, reactor following-load mode of operation is employed such as is described in U.S. Pat. No. 3,423,285 to C. F. Currey et al.

Upon an increase in load demand the plant operator opens the throttling valve 40 to the turbine 13 until the desired output is attained. The increased steam flow rate exhausted to the turbine lowers the secondary pressure and enhances head removal from the primary coolant. The corresponding drop in primary coolant temperature that would otherwise occur is avoided through manipulation of the control rods 58 in response to the control signals obtained from the programmed average temperature control system (i.e., described in the Currey et al patent).

The chemical-shim control 15 includes a coolant-temperature program 61, a summer 63, a temperature compensating network 65 and a non-linear gain network 67. The coolant temperature program 61 is a converter on whose input the turbine impulse pressure is impressed. The program 61 converts the turbine impulse pressure into corresponding electrical parameters $T_{ref}$ each defining a desired coolant temperature. $T_{ref}$ and $T_{avg}$ from temperature averaging unit 60 are impressed on summer 63 which compares their parameters and produces a temperature error $T_e$ in its output. This output $T_e$ is impressed on the input to the compensating network 65. The compensated temperature output, $T_{ec}$, is impressed on the non-linear gain network 67. The output of network 67 controls the chemical shim changing facility 17.

The chemical-shim control is shown in more detail in FIG. 2. The coolant temperature program 61 has a characteristic as shown by its graph. In this graph temperature is plotted vertically and impulse power impressed horizontally. The temperature-power characteristic is shown as a rising characteristic. The summer 63 is a high-gain amplifier. $T_{ref}$ from program 61 is impressed on its negative (inverting) input 71 and $T_{avg}$ from unit 60 on its positive input 73.

The compensating network 65 includes potentiometers $P_1$, $P_2$, $P_3$, $P_4$ amplifiers 75, 77, 79 and inverter 81. Amplifier 79 is the output amplifier delivering the compensated temperature $T_{ec}$ at its output. A signal proportional to $T_e$ is derived across potentiometer $P_1$ and impressed directly on an input of amplifier 79. The magnitude of $P_1$ determines the proportional gain K. $P_3$ and amplifier 77 cooperate to integrate the signal $T_e$ over the period during which it is impressed. $P_3$ determines the time constant $\tau_2$ of the integrating component. This integrated signal is impressed on the amplifier 79 through inverter 81 and is inverted in polarity. $P_2$ and $P_4$, which are equal, and amplifier 75 provide the derivative component. $P_2$ and $P_4$ determine the time constant $\tau_1$ of the derivative component. $P_4$ determines the feedback of amplifier 75. The output of the compensating network 65 is proportional, plus integral, plus derivative (PID) of $T_e$ and is $T_e$ multiplied by:

$$K(1+(\tau_1 \cdot S/1+\tau_1 \cdot S)+(1/\tau_2 S))$$

where S is the La Place operator d/dt.

The non-linear gain network 67 includes the contactors 83, 85, 87 which may be part of a single unit or words or bits of a computer. There is also a comparator 89, input amplifier 91, output amplifier 93 and potentiometers $P_5$ and $P_6$. The amplifier 93 has feedback FB1 which produces the saturation characteristic.

Figure 3:
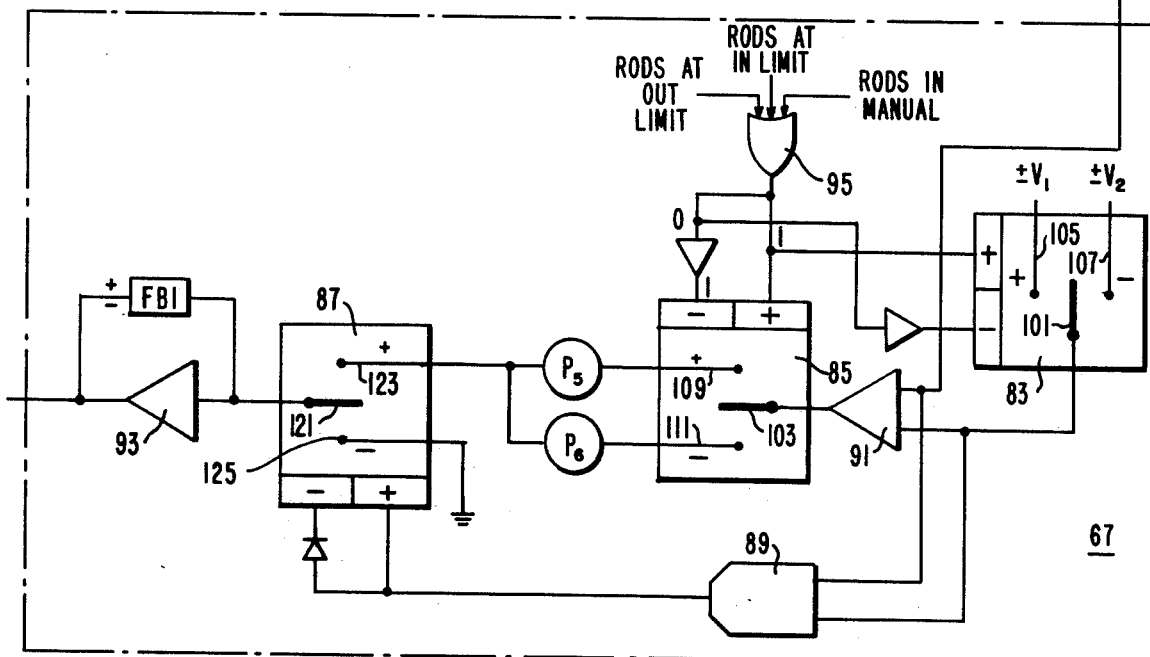
FIG. 3 is a graph illustrating the operation of the non-linear gain network.
Figure 3:
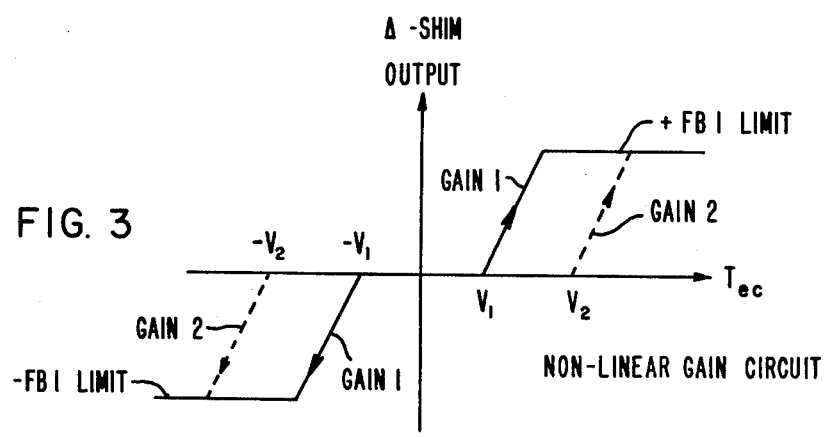

The function of the non-linear gain network 67 may be understood from FIG. 3. In FIG. 3, the change in shim Δ-SHIM is plotted vertically and the compensated temperature $T_{ec}$ horizontally. Two gain characteristics GAIN 1 and GAIN 2 are shown. GAIN 1 has a narrow dead band $+V_1$ to $-V_1$ and GAIN 2 a wide dead band $+V_2$ to $-V_2$. The saturation limit is determined by FB1. The gain varies only along the lines GAIN 1 and GAIN 2. For settings along these lines the Δ-shim is changed linearly with the change in temperature. For settings along the dead band Δ-shim is 0. For settings at the feedback limits Δ-shim is constant positive or negative.

The contactors 83 and 85 are controlled in accordance with the setting of the control rods 58 through OR logic unit 95. Contactor 83 sets the dead band in the characteristic of non-linear gain unit 67 and contactor 85 the variable gain. Depending on the setting of the rods a positive or negative signal is impressed on the contactors 83 and 85. As indicated with the rods at eitht of their limits or in manual a positive signal is impressed on contactors 83 and 85 through OR logic unit 95. With the rods in automatic or not at their limits, a negative signal is impressed on contactors 83 and 85. The contactors 83 and 85 are shown with moveable contacts 101 and 103 and sets of fixed contacts 105 and 107 and 109 and 111. In actual practice these contactors are solid state components or bits of a computer. The contacts are shown as mechanical elements in the interest of facilitating explanation of the invention. With a positive signal on contactors 83 and 85, moveable contacts 101 and 103 engage contacts 105 and 109 respectively. The characteristic of the non-linear gain unit then has the narrow dead band $+V_1$, $-V_1$ (FIG. 3) and GAIN 1. GAIN 1 is set by potentiometer $P_5$. With a negative signal on the contactors 83 and 85 moveable contacts 101 and 103 engage contacts 107 and 111 respectively. In this case the characteristic of unit 67 has the wide dead band $+V_2$, $-V_2$ (FIG. 3) and GAIN 2. GAIN 1 and GAIN 2 need not be parallel as shown; i.e., Δ-SHIM need not change at the same rate for the two conditions.

The signal derived from contact 101 is essentially a $T_{ec}$ magnitude. This magnitude is compared with the $T_{ec}$ magnitude derived from amplifier 79. If $T_{ec}$ exceeds $/V_1/$ in the narrow-band setting or $/V_2/$ in the wide-band setting a positive signal is impressed on contactor 87 and its moveable contact 121 engages fixed contact 123. In this case the command of unit 67 is to change Δ-shim in accordance with GAIN 1 or GAIN 2, as the case may be, at a polarity depending on the relative magnitudes of $T_{ec}$ and $\pm V_1$ or $\pm V_2$. In case $/V_1/$ or $/V_2/$ are greater than the corresponding $T_{ec}$, moveable contact 121 engages contact 125 and the command is to maintain Δ-shim at 0. For GAIN 1 or GAIN 2 amplifier 93 sets the maximum available Δ-shim.

The shim-changing facility 17 may be similar to that taught by Maldague et al. This facility includes a storage tank and evaporator 131 which receives coolant tapped from the primary loop 26-30. In tank 131 a portion of the coolant is evaporated and condensed and supplied as pure water (or other pure fluid) to a pure-water tank 133. Coolant in which neutron absorbing material is concentrated is supplied to tank 135. Tank 133 is connected to loop 26-30 through a controllable valve 137 and a pump 139. Tank 135 is connected to loop 26-30 through a controllable valve 141 and a pump 143. Valves 137 and 141 are controlled from the output of the non-linear gain network 67.

In operation the setting of the valves 137 and 141 depends on the output of the comparator 89 and on the setting of the contactors 83 and 85. If contactor 83 is set for the narrow dead band $+V_1$ to $-V_1$ and $/T_{ec}/$ is less than $/V_1/$, the output of amplifier 93 is 0 and valves 137 and 141 are closed. If $T_{ec}$ is greater than $+V_1$, valve 137 is closed and valve 141 is open to an extent depending on $T_{ec}-V_1$. Concentrated neutron absorbing material is than supplied to the coolant. If $T_{ec}$ is less than $-V_1$, valve 141 is closed and valve 137 is open to an extent depending on the magnitude $/T_{ec}/-/V_1/$ and the pure water is supplied to the coolant to reduce its neutron absorption. The operation when the dead band is $+V_2$ to $-V_2$ is similar.

While a preferred embodiment has been disclosed herein, many modifiications thereof are feasible. This invention is not to be restricted except insofar as is necessitated by the spirit of the prior art.

What is claimed is:

1. Power supply apparatus including a nuclear reactor having a fuel core to be cooled by a coolant in heat-interchange relationship with said core, said coolant to be heated by said core, conductors, connected to said reactor, for conducting said coolant from said reactor and for returning said coolant to said reactor, a turbine, connected to said conductors, to derive energy from the coolant in said conductors, means, connected to said turbine, for varying the power delivered by said turbine, means, connected to said reactor, for adjusting the chemical shim in said coolant, means, connected to said reactor, for deriving the average temperature of said coolant, means, connected to said turbine, for deriving therefrom a programmed reference temperature dependent on the power delivered by said turbine, the said reference temperature correlating said power to corresponding desired coolant temperatures, comparison means, connected to said coolant-temperature deriving means and to said reference-temperature deriving means, for deriving a compensated temperature error, and means connected to said comparison means and to said chemical-shim-adjusting means for changing the chemical shin in said coolant in dependence upon said temperature error in a sense to reduce said compensated temperature error.

2. The apparatus of claim 1 wherein the coolant average-temperature deriving means includes first temperature measuring means, connected to the conductors conducting the coolant from the reactor and second temperature measuring means connected to the conductors returning the coolant to the reactor and the average temperature of the coolant is the average of the measurements of the first and second temperature-measuring means.

3. The apparatus of claim 1 wherein the temperature-error is converted into an electrical analog and compensated temperature-error deriving means includes electrical compensating means whose input is said electrical analog and whose output is an electrical compensated temperature-error appropriately adjusted in sensitivity and time response.

4. The apparatus of claim 3 wherein the electrical compensating means is a proportional plus integral plus derivative controller.

5. The apparatus of claim 4 wherein the chemical-shim adjusting means includes non-linear gain means on whose input the electrical analog of the compensated temperature error is impressed and from whose output the command for adjusting the chemical shim is derived.

6. The apparatus of claim 5 wherein the non-linear gain means has an adjusted-shim-output-compensating-temperature-error characteristic having dead band for suppressing hunting and improving stability, a variable region permitting gain adjustment and a saturation region for suppressing overload.

7. The apparatus of claim 5 wherein the reactor has control rods and the non-linear gain means is set in accordance with the setting of the control rods.

8. The method of controlling the neutron absorbing means in the coolant of a nuclear reactor of nuclear-reactor power-supply apparatus, wherein the nuclear reactor supplies power to a turbine, the said apparatus including means for adjusting the chemical shim in said coolant, the said method comprising deriving the average temperature of said coolant, deriving a programmed reference temperature dependent on the output power of said turbine, said referenced temperature correlating said power to corresponding desired coolant temperatures, comparing said average temperature and said reference temperature to derive a temperature error, and controlling said chemical shim adjusting means to adjust the chemical shim in said coolant so as to reduce said temperature error.

9. Power supply apparatus including a nuclear reactor having a fuel core to be cooled by a coolant in heat-exchange relationship with said core, said reactor including control rods for varying the temperature of said coolant, conductors, connected to said reactor, for conducting said coolant from said reactor and for returning said coolant to said reactor, a turbine, connected to said conductors, to derive energy from the coolant in said conductors, means, connected to said turbine, for varying the power delivered by said turbine, said control rods varying the temperature of said coolant in accordance with the power demands of said turbine, said control rods being in a normal mode for normal operation of said reactor and turbine and in a nonnormal mode for nonnormal operation of said reactor and turbine, means, connected to said reactor, for supplying chemical shim to said coolant for supplementing the control of said control rods, said supplying means including means for adjusting the magnitude of chemical shim in said coolant, means, connected to said reactor, for deriving the average temperature of said coolant, means, connected to said turbine, for deriving therefrom a programmed reference temperature dependent on the power delivered by said turbine, said reference temperature correlating said power to corresponding desired coolant temperatures, means, connected to said coolant-temperature deriving means and to said reference temperature deriving means, for deriving a signal measuring the temperature error by which said coolant temperature deviates from said reference temperature, a nonlinear gain network having input terminal means and output terminal means, means, connecting said network to said control rods, for setting said network in one setting in which said network has one output when said control rods are in said normal mode and for setting said network in another setting in which said network has another output when said control rods are in said nonnormal mode, means impressing said signal in said input terminal means, and means, connecting said output terminal means to said chemical shim adjusting means, to set the chemical shim in said coolant, in accordance with the one or other output of said network, as the case may be, so as to reduce the temperature error.

10. The apparatus of claim 9 wherein the one output and the other output of the nonlinear gain network each has a dead band over a range of the input signal corresponding to a range of the temperature error, the setting means being inactive to adjust the chemical shim over each said dead band, the dead band for said one output being greater than the dead band for said other output.

11. The method of controlling the neutron-absorbing means in the coolant of a nuclear reactor of nuclear-reactor power-supply apparatus, said nuclear reactor having control rods for controlling the temperature of said coolant and said apparatus including chemical shim for supplementing the control rods in controlling the temperature of said coolant and means for adjusting the chemical shim in the coolant, said apparatus also including a turbine supplied with energy by said nuclear reactor through said coolant, said apparatus also including means, connected to said turbine, for varying the power delivered by said turbine, the said method comprising varying the power delivered by said turbine in accordance with the demands of its load, in dependence upon the power delivered by said turbine setting said control rods in a normal mode for normal operation of said reactor and turbine and in a nonnormal mode for nonnormal operation of said reactor and turbine, deriving the average temperature of said coolant, deriving a programmed reference temperature dependent on the output power of said turbine, said reference temperature correlating said power to corresponding desired coolant temperatures, comparing said average temperature and said reference temperature to derive a temperature error, and except over a range of temperature errors over which said chemical-shim adjusting means is quiescent, adjusting said chemical shim through said adjusting means in dependence upon the temperature error so as to reduce said temperature error, said range of quiescence being greater in the normal mode of said control rods than in the nonnormal mode of said control rods.

* * * * *